Sept. 4, 1956 R. A. ANDERSON 2,762,014
AUTOMATIC NETWORK TESTER
Filed June 12, 1952 11 Sheets-Sheet 1

Inventor
Ralph A. Anderson
By Kegan & Kipnis
Attorneys

Sept. 4, 1956 R. A. ANDERSON 2,762,014
AUTOMATIC NETWORK TESTER
Filed June 12, 1952 11 Sheets-Sheet 2
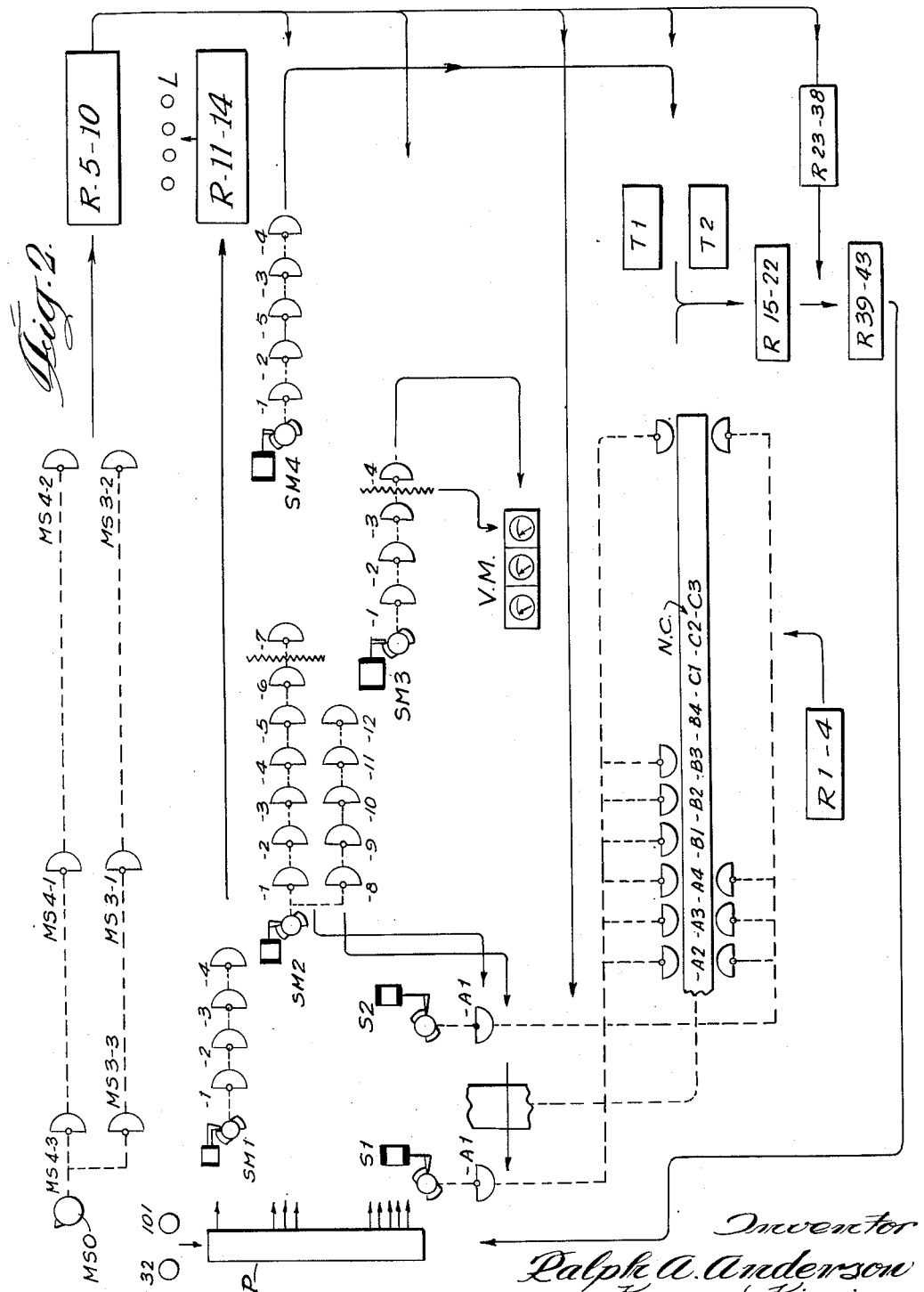

Sept. 4, 1956  R. A. ANDERSON  2,762,014
AUTOMATIC NETWORK TESTER
Filed June 12, 1952  11 Sheets-Sheet 3

Inventor
Ralph A. Anderson
By Kegan & Kypnis
Attorneys

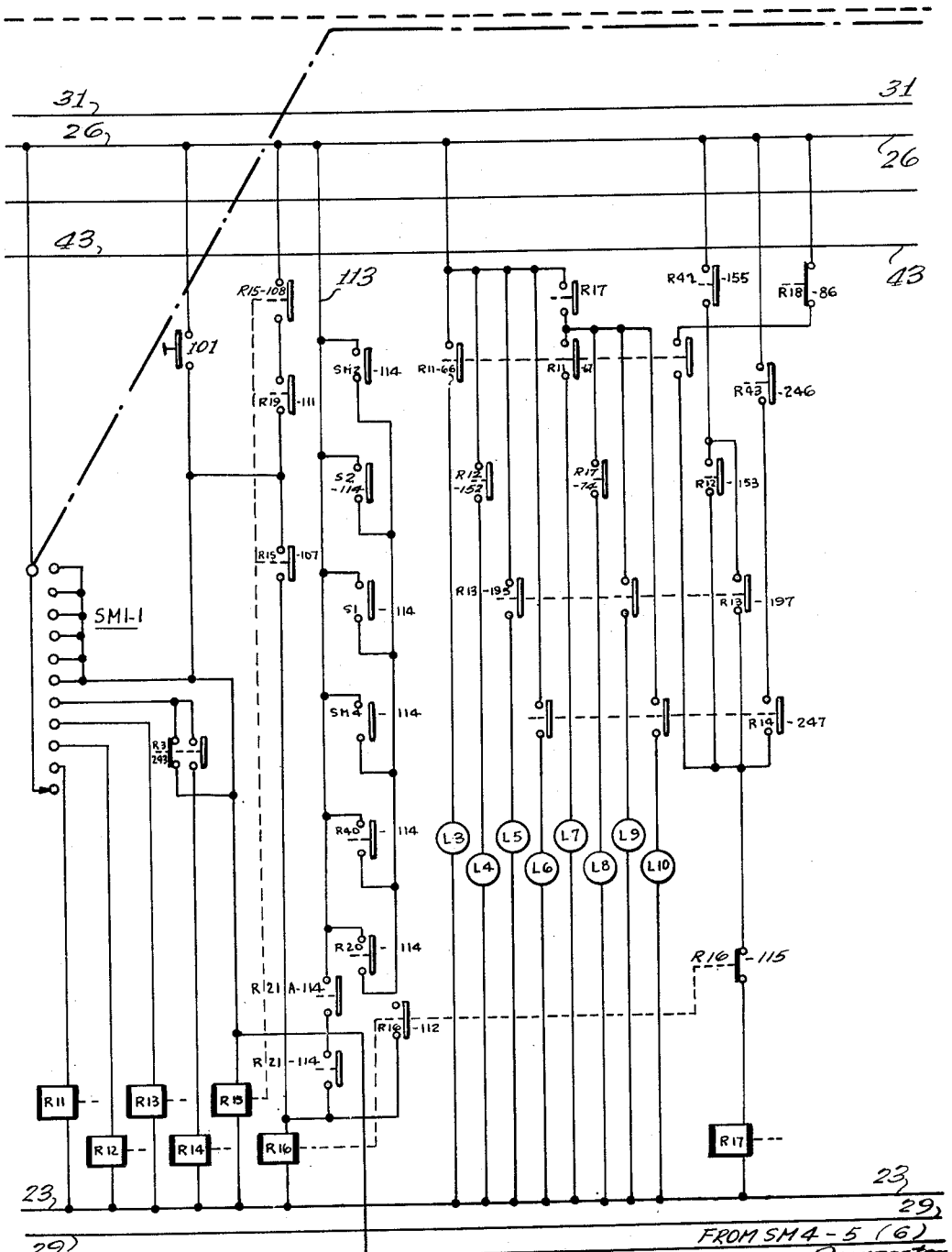

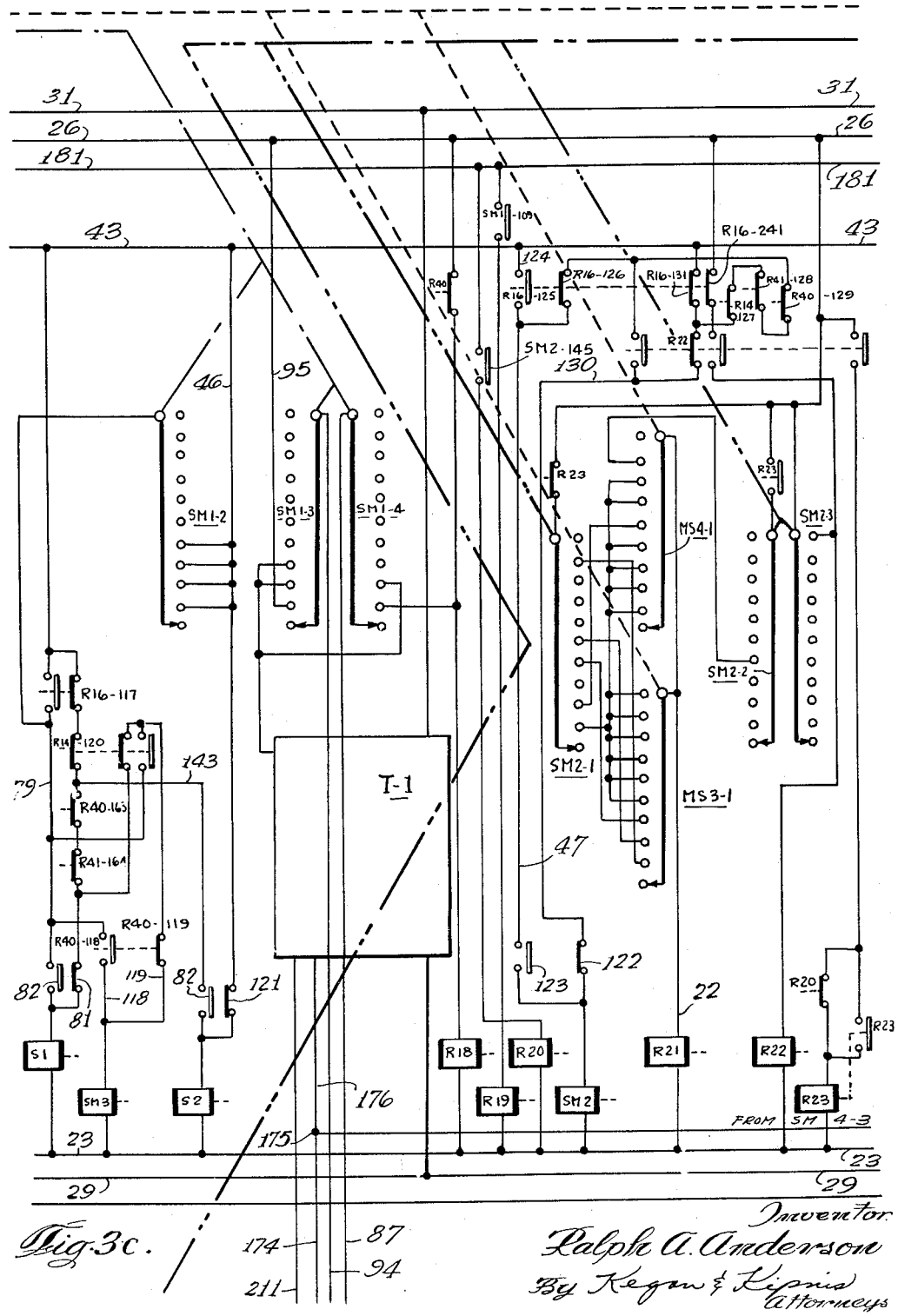

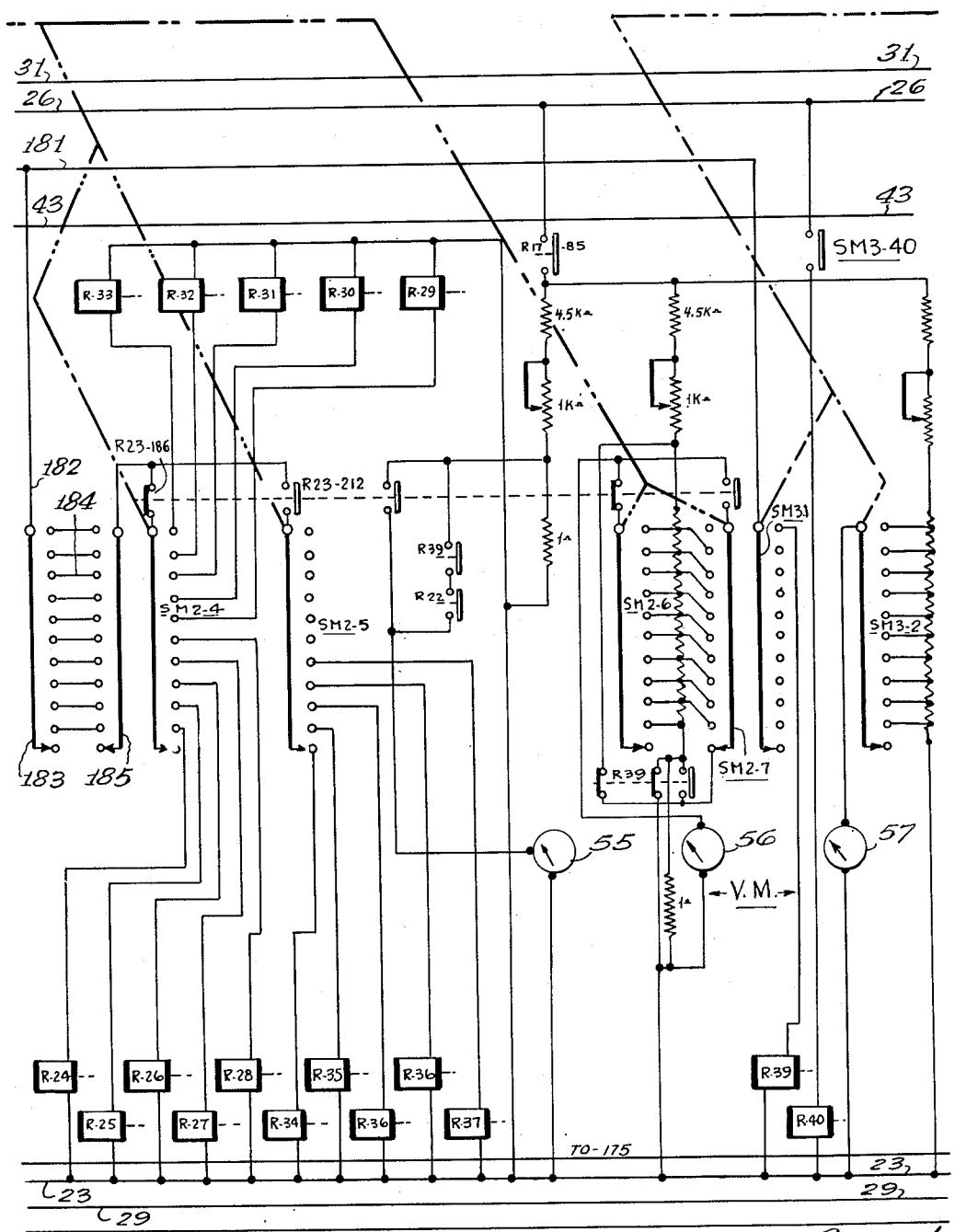

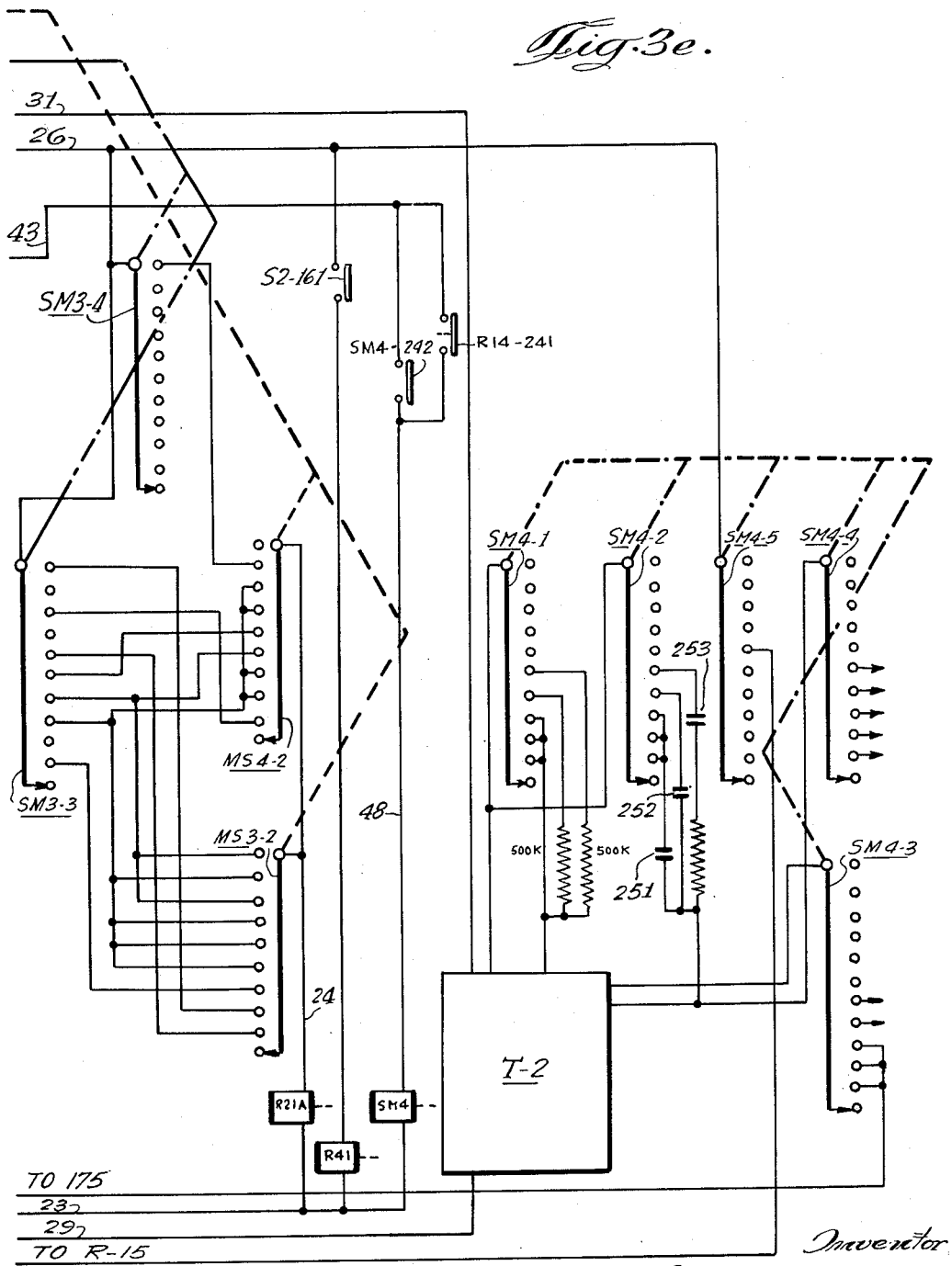

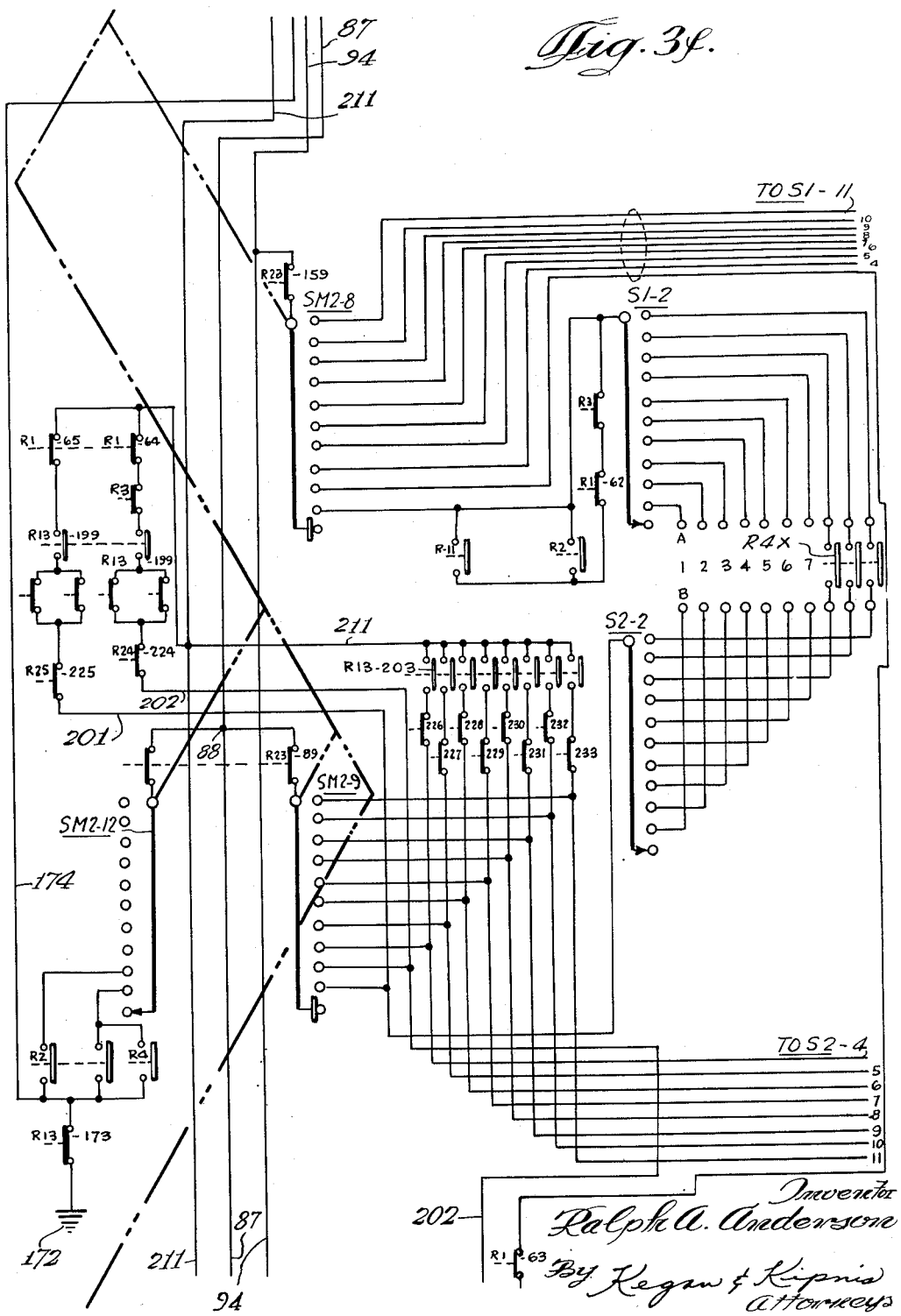

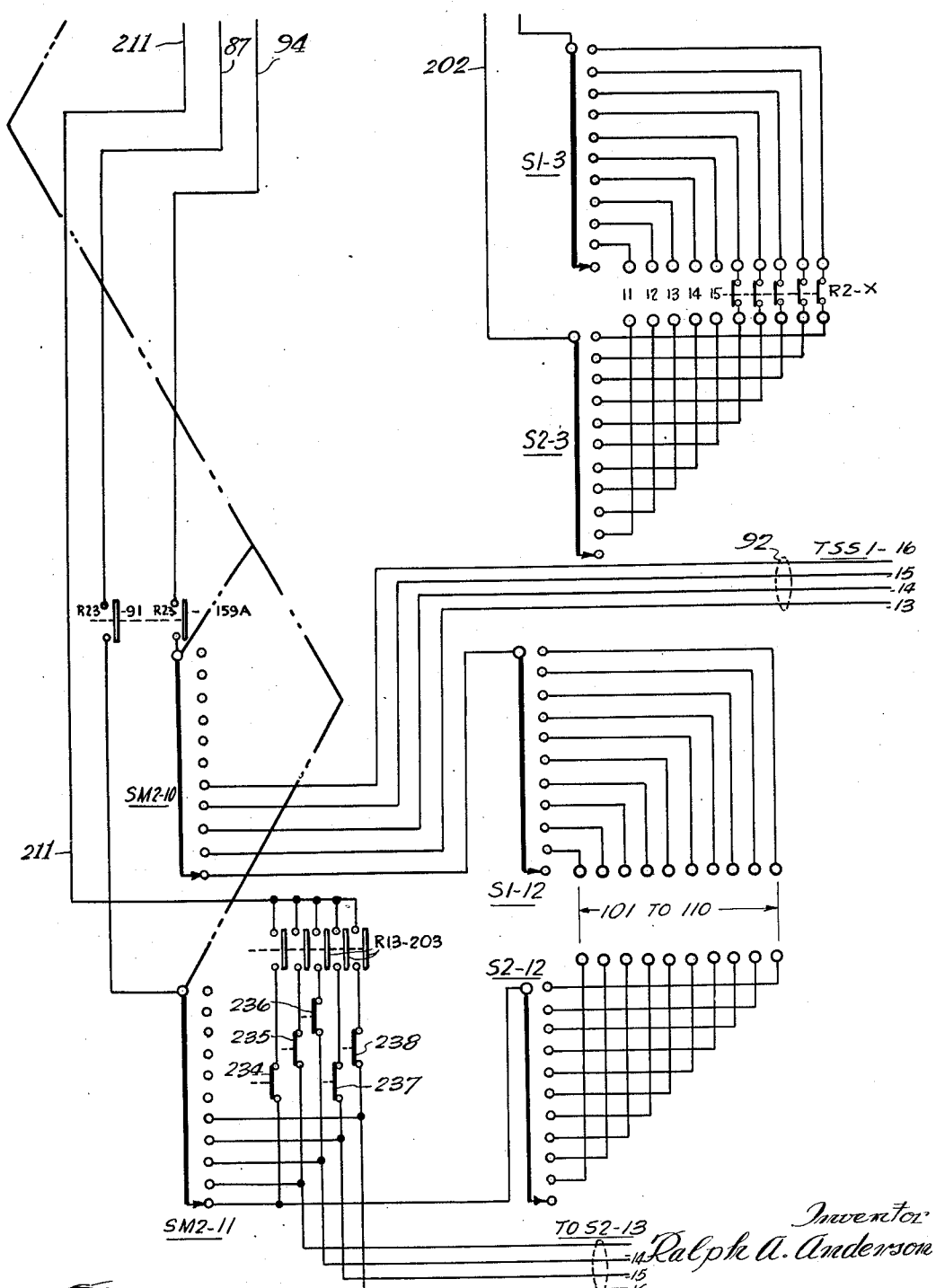

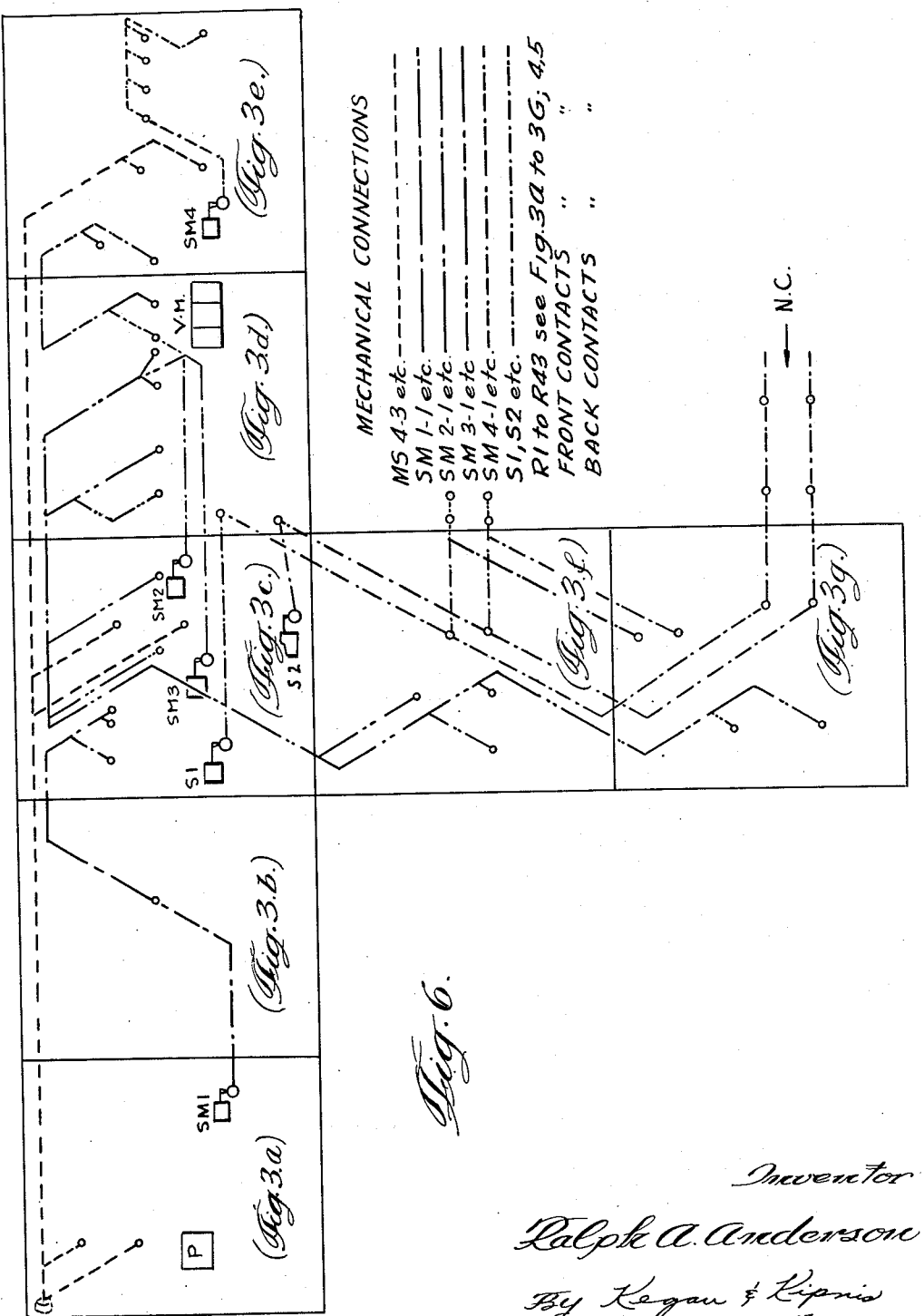

United States Patent Office 2,762,014
Patented Sept. 4, 1956

2,762,014

AUTOMATIC NETWORK TESTER

Ralph A. Anderson, Evanston, Ill., assignor to Panellit, Inc., Chicago, Ill., a corporation of Illinois Application June 12, 1952, Serial No. 293,143

14 Claims. (Cl. 324—73)

The present invention relates to a device for rapidly, automatically testing multiple-circuit networks respecting electrical characteristics. Upon the discovery of any off-normal condition in the network under test, an alarm is effected, identifying as to location the precise circuit component in which a functional disorder has been discovered.

In the manufacture of industrial apparatus involving electrical circuits in multiplex forms or involving various types of electrical constants, it is ofttimes advantageous to be able at intermediate stages in assembly as well as at the completion of final wiring and inspection, to make a determination of accuracy and propriety respecting circuit details and electrical devices. Frequently these determinations involve the making of various kinds and numbers of preliminary or intermediate test operation, which if required to be performed manually would consume an inordinate amount of time on the part of skilled and highly trained engineers and mechanics. Such methods of factory procedure constitute major cost considerations while at the same time subjecting highly skilled personnel to monotonous and tedious repetitive switching operations.

It is accordingly a principal object of this invention to provide an automatically operating mechanism which will successively perform a variety of test operations upon any type of simple or involved electrical circuits, progressing from one test operation to another in rapid succession until all predetermined tests have been consummated successfully or until one or more conditions of circuit disorder is discovered.

A specific object is to enable such mechanism to perform a variety of testing programs to suit different network problems; for instance to make it possible that one network is tested rapidly as to continuity, ground shorts, and internal shorts and that another network is tested with similar rapidity as to capacitance or the like, with or without some or all of the other tests. Also, a network to be tested may consist only of a bundle or truss or assembly of wires or coils with two terminals each, or may comprise three-legged or multiple-legged components. Still other network variations will be mentioned or suggested hereinafter.

In its essential embodiment, the present invention comprises a bank of contact terminals conveniently accessible for plug connection with the network under test, so as to interpose each significant circuit detail between two or more cooperating contact terminals of the test apparatus. The test program is manually selected; a push-button is depressed, whereupon the device automatically applies all tests of the selected program to all of the components of the circuit or apparatus under test.

Upon completion of the full range of observations or upon encountering a condition of failure, the test apparatus is automatically brought to rest in readiness for succeeding tests. In the event of failure at any one point, the new tester designates, upon its interruption, the precise location of the disorder, whereupon the attendant may make a proper notation and resume the test cycle.

In the accompanying drawings:

Figure 2 is a highly schematic diagram to show the basic theory of operation hereunder.

Figures 3a to 3g jointly form a circuit diagram for the apparatus, which is complete except that some elements which occur at a number of places are shown only at some such places.

Figure 3A:
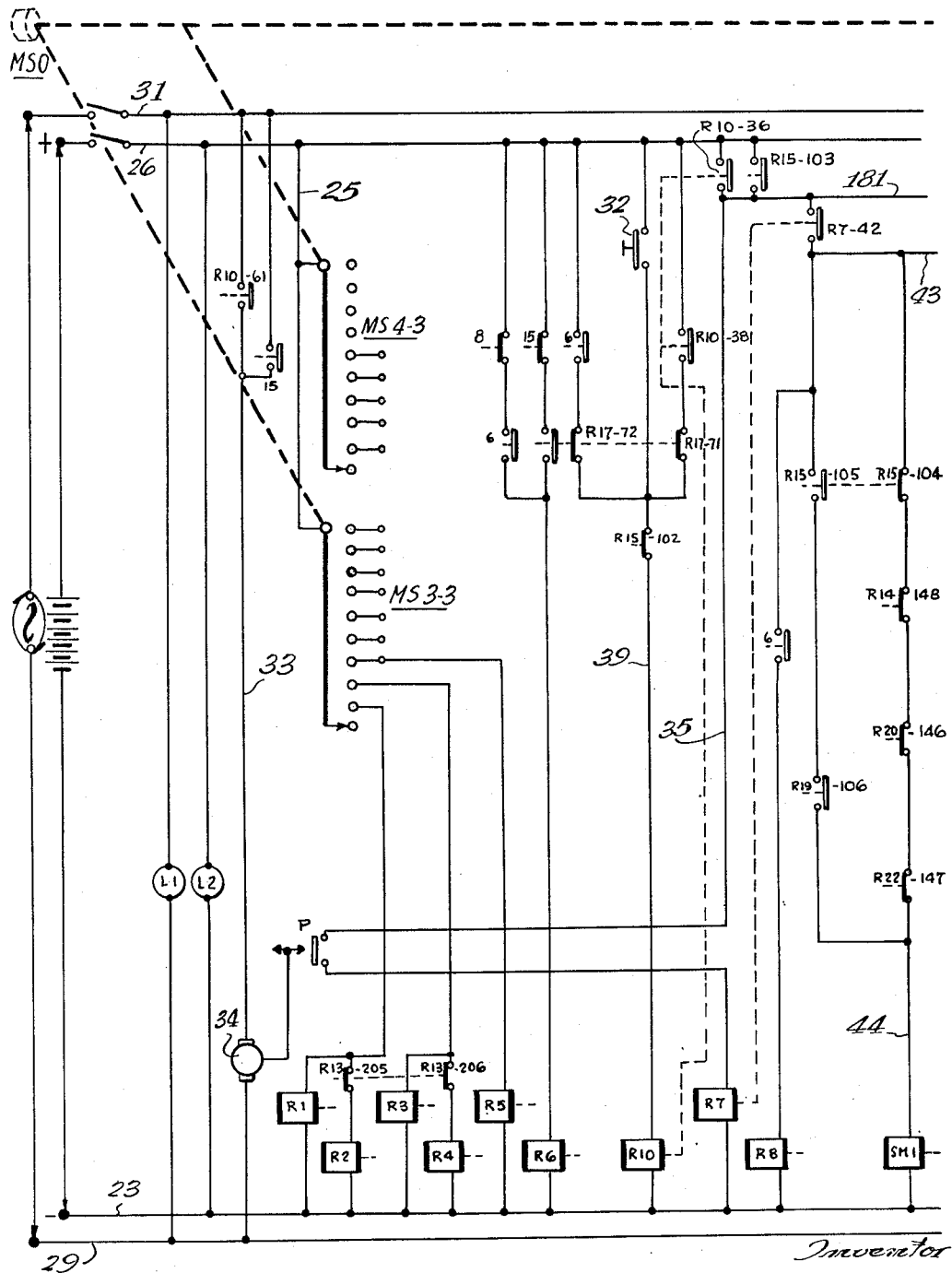
Figure 4:
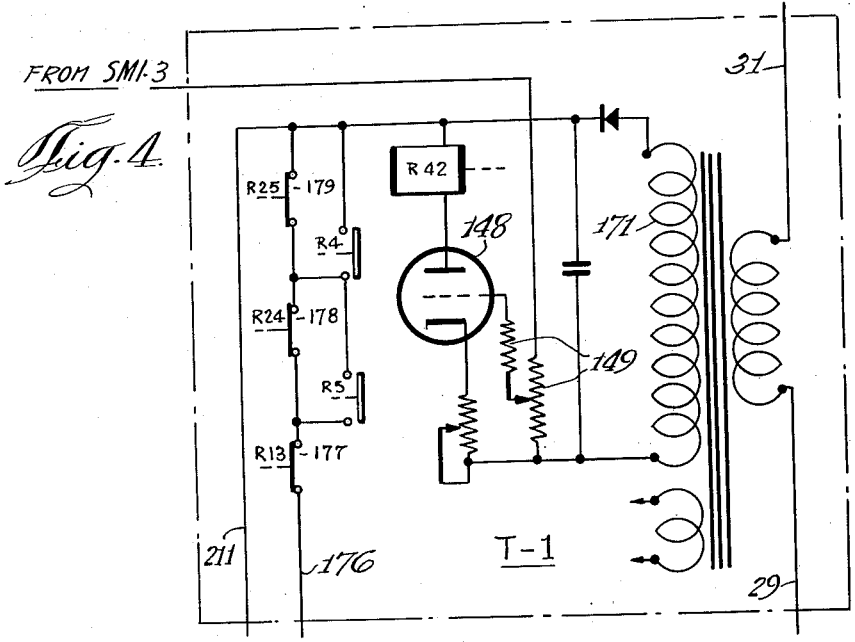

Figure 4 shows details of a circuit element or subcombination shown as a block diagram in Figure 3c.

Figure 5:
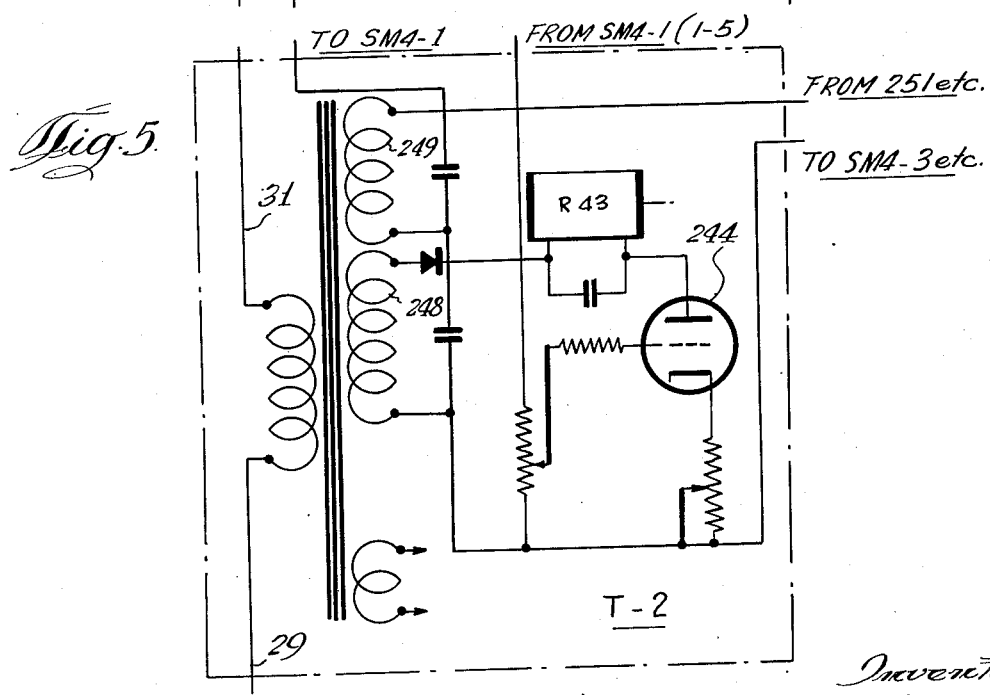

Figure 5 shows details of such a subcombination from Figure 3e.

Figure 6 is a chart showing the proper placement of Figures 3a to 3g and the position of diagrammatic guide lines or wiper shafts represented therein.

Figure 1:
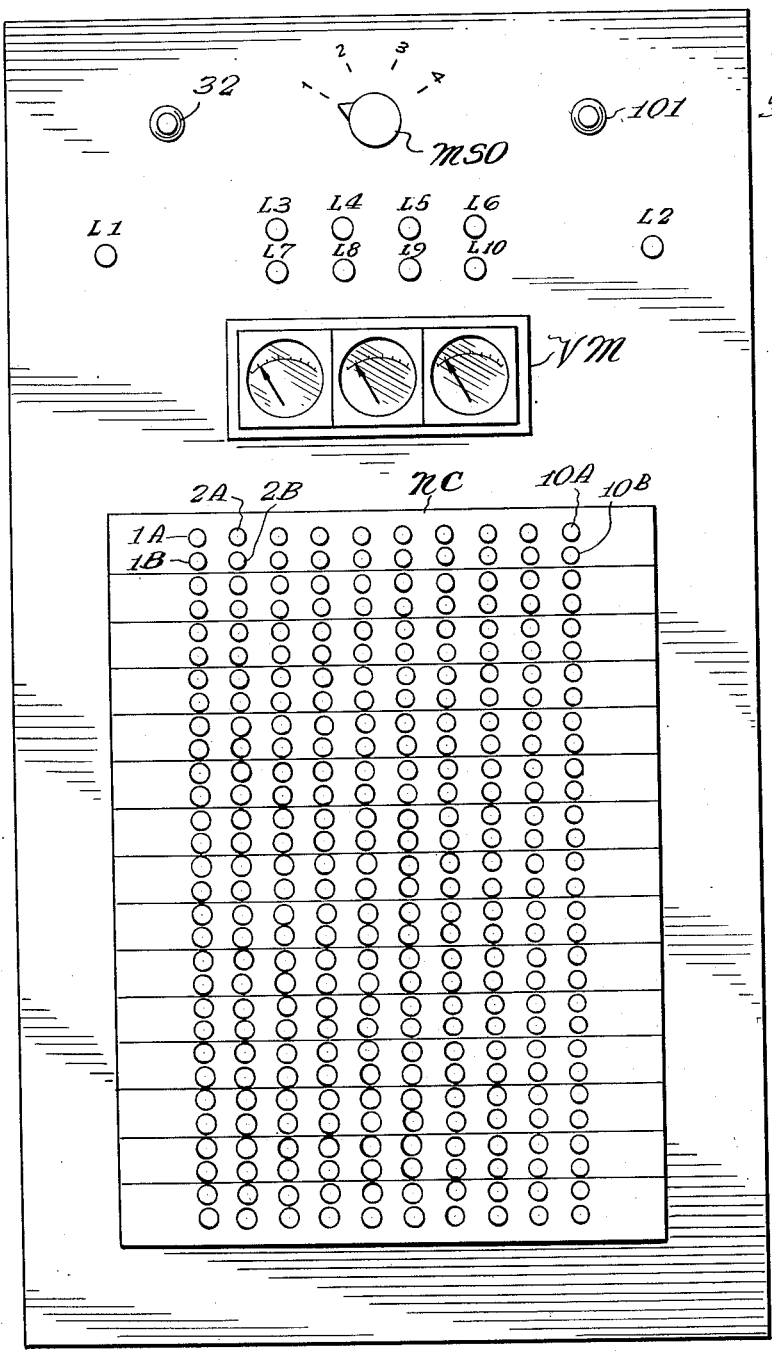
Figure 1 is a diagrammatic front view of apparatus hereunder.

Referring now particularly to Figure 1:

The apparatus comprises, for manipulation and inspection by the operator, a network connector panel NC having connector units 1A, 1B; 2A, 2B, etc.; a manual switch operating knob MSO; a system of volt meters VM adapted to indicate the location upon the network connector NC of any faulty network component, found in the operation of the device; a pushbutton 32 adapted to start any one kind of test to which the device is adapted or to continue the same after the finding of a fault; and a reset pushbutton 101 to reset the device in starting position so as to apply the selected type of test to a new network or to apply it once more upon the originally connected network.

Desirably the apparatus also contains a system of pilot lamps. Two of these, shown as L–1 and L–2, simply indicate in well known manner whether the alternating and direct current sources utilized in the apparatus are connected and active. Another system of lamps L–3, etc., is adapted to give more specific information. The present embodiment of the device is assumed to provide a capacity of four different types of tests (the exact nature and execution of which is subject to change as will be described); and the lamps L–3, L–4, L–5 or L–6 are lighted respectively when the device operates normally and without fault in the first, second, third and fourth type of test. Under the same assumption the lamps L–7, L–8, L–9 or L–10 are lighted respectively, upon the discovery by the test apparatus of a fault in the first, second, third or fourth type of tests.

Referring now particularly to Figure 2, the manual switch operated by the operating knob MSO serves to set the device for different test programs, for instance for a program providing successively a continuity test, a ground short test, an internal insulation test, and a capacitance test. In order to provide for this or other test programs, the manual switch is provided with a plurality of plural-position wipers, herein identified by the symbols MS3–1, MS3–2, MS3–3, and the additional symbols MS4–1, MS4–2 and MS4–3. The need for such a relatively great number of switch terminals, as contained in the combination of six wipers and related stepping contacts, will be understood when it is considered that the aforementioned program as well as other usual electric test programs, applied upon a great number of network terminals, involve tests with greatly conflicting requirements. For instance, as will be explained more fully hereinafter, electric continuity between two terminals on the network connector NC is basically required for the continuity test, while the same condition must basically be prevented for the internal insulation test.

During any one test program, comprising a single test or successive tests, the manual switch remains stationary. It is manipulated only to modify the entire test program.

Figure 2 shows below the manual switch, a primary master switch operating device SM1, diagrammatically indicated as a solenoid, pawl and ratchet. It operates rigidly interconnected primary master switch wipers SM1-1, SM1-2, SM1-3 and SM1-4 (designated on the drawing as -1, -2, etc.), through a cycle of positions. This cycle is relatively long; one step of each of said wipers is made for each type of test in the selected test program, to initiate such type of test.

An intermediate master switch operator SM2, of similar construction, is provided for intermittent operation with a relatively shorter cycle, that is, a cycle providing one step of the intermediate switch wipers for each set of ten connector units on the network connector NC. A greater number of wipers is required for this intermediate switch, as indicated at SM2-1, SM2-2, etc., to SM2-12. In addition it is necessary at least for certain types of test programs to provide one or more additional intermediate master switch operators SM4 with a plurality of wipers SM4-1 to SM4-5, having the same cycle of one step per ten network connector units.

Most rapid operation throughout the present device is provided in and for a set of secondary stepping switch operators S1, S2, providing a great number of wipers S1-1, S1-2, etc. (here indicated by -1, etc.), and serving to apply the selected test program to the successive connector units 1A, etc., of the network connector NC, in rapid succession. At least one and frequently both of these secondary switches S1, S2 are adapted to make ten stepping contacts for each one operation of the intermediate switch SM2, usually within about one second or less than one second.

With similar frequency, an auxiliary switch operator SM3 functions simultaneously and in phase with the secondary switches S1 and/or S2, in order to correlate the voltmeters MV with the different positions of the network connector and sometimes with different test units T-1 and/or T-2, while preventing connection of any one connector unit on the panel NC with any improper component of the voltmeter, test unit or other assemblies.

These different interdependencies of the manual, master, intermediate, secondary and auxiliary switches, and other elements, are roughly visualized by the arrows shown in Figure 2, in a manner which will be understood more fully upon a study of the details which follow. In order to indicate the relatively infrequent operation of the primary master switch, the more frequent operation of the intermediate switch or switches and the most frequent operation of the other elements, there is shown a pulsator P sending a single pulse to SM1 while sending several to SM2 and many to S1, S2 and SM3.

In addition to the thirty or more stepping wipers of the manual, master, intermediate, secondary and other switches described, the apparatus contains a considerable number of two-position relays, most of which have large numbers of two-position contactors; it being understood of course that a single relay symbol such as R1 may represent a number of coils and coordinated relay contactors, connected in parallel with one another.

These two-position relays will best be considered in six separate groups. The first of these, containing the relays R1, R2, R3 and R4, is largely or exclusively used to establish or eliminate bridgements between different connector units 1A, 1B, etc.; mainly in order to enable the same type of probing circuits, to be described hereinafter, to operate during continuity, internal resistance and other tests.

A second group of relays, R5 to R10, serves to apply the pulsations of the pulsator P to the different stepping switch operators and to perform related functions.

A third group of relays, R11 to R14, serves to connect and disconnect the aforementioned pilot lamps L-3 to L-6 and alarm pilot lamps L-7 to L-10.

A fourth group of relays, R15 to R22—in many respects the most important group of the present device—serves to arrest the testing device upon the discovery of a fault in any of the different tests of the test program, while allowing suitable resumption of tests and other auxiliary functions.

A fifth group of relays, R23 to R38, serves alarm blocking functions during such tests as the internal resistance test, as will be explained.

A sixth and last group of relays, R39, R40, R41, R42 and R43, cooperates with the groups R5 etc. and R16 etc., in effecting the central control functions of the device upon the discovery of a fault.

Many of the relays starting with R7 operate in rapid or semi-rapid cycles of energization and de-energization under the influence of the pulsating device P, while the relays R1 to R6 are free from such influence and are either energized or de-energized throughout any one test of a program.

Referring now to Figures 3a to 3g: the overall arrangement of these figures is substantially the same as in Figure 2, in order to facilitate the reading of the diagram. In each automatic stepping switch the well known eleven-step and eleven-terminal arrangement is used. The wipers of each stepping switch described hereinabove are geared together for simultaneous operation. As in the case of the two-position relays, one or several solenoids may be used in well known manner, in any one of these automatic switches, depending upon the number of wipers to be moved over their correlated terminals in each of the individually actuated switch units.

The wipers identified as MS3-3 and MS4-3 (Figure 3a) constitute a first set or bank of contact arms, in the primary manual switch. These wipers are connected together over a line 25 with the positive side 26 of a low-voltage source of direct current such as a 28-volt battery supply. The wipers MS3-1 and MS4-1 (Figure 3c) of another bank of the manual switch are connected together electrically over a line 22 in series with a reset relay winding R21 and with the negative side 23 of the direct current supply. A third bank of wipers MS3-2 and MS4-2 (Figure 3e) of the manual switch are connected together over a line 24 and in series with the winding of an auxiliary reset relay R-21a and thence also to the negative side of voltage 23.

The first or lowermost contact point of each manually actuated stepping switch wiper is unconnected and constitutes an out-of-function or zero position of the switch. Less than all of the contact points of the manual switch are functionally utilized herein; but several are available for suitable connection in changed testing programs, as will be understood upon completion of the study hereof.

In order to establish operative condition of the apparatus, the manual switch operator MSO is set to the predetermined test program, resulting in the position shown. The start pushbutton 32 is then momentarily depressed. This completes a circuit 39 (Figure 3a) which includes a normally closed contact pair R15-102 and the winding of the relay R10. The latter relay operates several contact pairs R10-61, etc., of which one pair, R10-61, in line 33, normally open and now closed, starts the motor of the pulse generator motor or current interrupter 34. A second contact R10-38, in series with others to be explained later, seals in the relay coil R10.

The current interrupter 34 operates a contact pair P located in a line 35 which supplies positive voltage to successively complete and break the energization of relay R7. The latter relay is operative at this time since a normally open contact R10-36, interposed between the bus 26 and line 35, is held closed by coil R10.

The positions generated in circuit 35 by the contact pair P of generator 34 are reflected in the successive energization and de-energization of relay R7. The latter accordingly opens and closes a contact pair R7-42, causing stepping switch operating, pulsating signals to be emanated over a branch bus line 43, connected to the line 26 through the switch R10-36. From the pulsating branch bus 43 extend several pulsating, tributary lines, including:

Line 44 for pulsating the winding SM1 of the primary master stepping switch;

Line 45 for pulsating the windings of the secondary stepping switches S1, S2 and auxiliary switch SM3 (Figure 3c);

Line 46 to pulsate the secondary switch S2 under certain conditions, in place of the line 45;

Line 47 to energize the intermediate switch winding SM2 (Figure 3c); and finally Line 48 for pulsating the winding of a capacitor testing master switch SM4 in certain types of test programs (Figure 3e).

Winding SM1 (Figure 3a) actuates a multiple wiper stepping switch which includes the movable wiper elements SM1-1 (Figure 3b), SM1-2 (Figure 3c), SM1-3, and SM1-4. The function of this switch is to correlate other parts of the apparatus to the class of circuit test operation to be performed, viz., continuity, insulation adequacy, ground short, etc., as selected by the manual switch MS; such correlation being in need of variations during the program. It accomplishes this by energization of certain control relays in accordance with the manual setting of pre-selector switch.

In the embodiment shown on the accompanying drawings, master stepping switch SM1 has been arbitrarily disclosed in a manner to reveal the alternative selection of four different kinds of test operations achieved through the energization of relays R11, R12, R13, and R14. As a consequence of the placement of its wiper SM1-1 (Figure 3b) into engagement with the contact points respectively numbered 1, 2, 3, or 4, it being noted that the zero contact point of this switch is inactive, there are conditioned for execution the tests for continuity, ground short, insulation short, and capacitance.

The intermediate control stepping switch SM2 in accordance with the present embodiment utilizes twelve stepping contacts ganged together. More than one coil may be required for such a number of wipers; these windings may then be wired in parallel. Thus, the SM2 winding or windings may be considered as one, operating all of the wipers SM2-1 to SM2-12 in unison.

The winding SM3 operates a supplementary stepping switch or relay having four interconnected wipers, which are numbered SM3-1, SM3-2, SM3-3, and SM3-4. This relay functions simultaneously with the series of secondary stepping relays S1, S2 and its purpose is to control the voltage divider elements VM (Figure 3d), which operate the indicating voltmeters 55, 56, and 57. The position at which the meter dials come to rest is regulated through a system of voltage dividers, and in this way a numerical integer by integer reading is established comprising the hundreds, tens, and units reading of the test operation.

The S1 winding is utilized in the rapid operation of secondary stepping switches, each having four levels of contacts, and operating wipers S1–1 etc. (Figures 3f and g). A corresponding series of stepping switches having a similar arrangement of wipers is also employed in the secondary group under the code reference designation S2–1 etc. In the case of these secondary stepping switches, provision is made for operating corresponding levels of companion switches parallelly for the accomplishment of continuity tests as will be later explained, and for operating one sequence switch of each companion pair throughout its full cycle of stepping concurrently with each single stepping position of the other switch of each pair. It is further to be noted that in connection with the sequence switches of this series, certain corresponding terminals are provided with functional shorting contacts operated by the relays R2, R4, which are utilized for bridging purposes during the performance of continuity tests to prevent false alarm signals. During the performance of other tests and particularly in connection with low insulation test determinations made upon multiple-leg circuit components, such shorting contacts require to be positively held open.

Having thus designated generally the main pieces of apparatus which are utilized in connection with the various test operations in accordance with this invention, there will now be described certain examples of circuit testing operations during the course of which the functional responses of the various apparatus will become revealed.

*Continuity test operation*

Let it be supposed that a piece of electrical apparatus requires to be tested having a variety of componential circuits and circuit elements. In accordance with the arbitrary provisions and arrangements of the manual setting switch, its indicator MSO is placed in contact in the position, in the instant example its #1 position, which suits the requirements of the subject under test. The starting push button 32 is then depressed, causing pulses in line 43 and branches 44 to 48, as already described.

As a consequence of the placement of manual switch arm MS3-3 on its #1 contact position (Figure 3a), there is completed an energizing circuit for relays R1 and R2 traceable from bus 26 over line 25 through the contact point No. 1, thence through the windings of relays R1 and R2 to negative bus 23. As a result of the energization of relay R1, all of the R1 contacts shown to be normally closed are thereupon opened. Also all of the R2 contacts shown to be normally open are at this time closed. As a result of the opening of the contacts R1–62, R1–62A, normally closed, which affect stepping switch wiper, S1–2, 3 (Figure 3f), the local circuits which lead to these wipers are both broken at these points. As a result of the opening of contact R1–64, the circuit is opened which leads to the wiper blade S2–2, and as a result of the opening of contact R1–65, the circuit is opened which leads to the secondary level wiper blade No. S2–3.

When the first impulse emanating from generator 34 and regenerated by relay contacts R7–42 enters upon line 44, it causes the operating relay SM1 to step its bank of wiper blades to the first position, at which time positive potential extended through wiper SM1–1 and its #1 contact causes to be energized the continuity test relay R11. All of the other SM1 wiper blades are also placed upon their #1 contact position, and as a consequence the system is now conditioned for performing a circuit continuity test.

As a consequence of the placement of wiper SM1–1 on its contact point #1 and the operation of relay R11, all of the contacts R11 normally open become closed. The R11–66 contact (Figure 3b) is closed, energizing the continuity test indicator lamp L3 to give a visual indication which signifies that the continuity test is being performed. As a consequence of the closure of the contact R11–67, a circuit is prepared for the energizing of continuity alarm indicator lamp L7 when alarm relay R17 becomes energized. As a result of the closure of contact R11–68, a circuit would be completed over the normally closed contacts R18–86, and R16–115, for energizing the relay R17, but this relay does not respond because at the same time contacts R18–86 are opened due to the normal energization of relay R18, as will appear later.

As a consequence of the placement of the SM1–2 stepping arm on its #1 contact position (Figure 3c), a circuit 46, obtaining pulsating current through the already described channels originating at bus wire 26 and coursing through contact pair R7, is extended through the wiper SM1–2 to the branch wire 79, establishing a source of positive potential pulsations for the operation of the secondary stepping switches S1, S2 and their companion switch SM3. This source remains effective even when, subsequently the primary source 45 becomes cut off due to the opening of the zero position "back contacts" 81 of the secondary stepping relays. (As a consequence of moving off of the zero position, the "back contacts" 81 are opened, but at the same time the "front contacts" 82 are closed, whereupon the stepping impulses for the further operation of these stepping switches are made available over the just described circuit including wiper blade 51 and alternative circuit path 79.)

A branch of the current which traverses the winding of relay R18 (Figure 3c) is the probing circuit current which endeavors to find an opening or continuity break in any of the circuits under test and is traceable from negative bus 23 through the winding of relay R18, the associated contact point #1 of wiper SM1-4, line 87 to the junction point 88 (Figure 3f). From this point a lead connects to each of the wipers SM2-9 and SM2-11 directly controlling the secondary switches. Because contact pair R23-89, in series with SM2-9, is the only one normally closed, contact pair R23-91 in series with SM2-11, being normally open, the probing circuit extends at this time only to the wiper SM2-9 of the intermediate stepping switch SM2. From this point the circuit is traceable over any one of the lines in cable 92 depending upon the position of wiper SM2-9, provision being made, as shown above, that distributor arm SM2-9 remains in each of its contact positions while any of the related distributor wipers S2-2, S2-3, etc., describes a full cycle of progress through its entire sweep of eleven contacts. (Even during this stepping from one stepping switch contact to another the probing circuit can be kept closed, by the use of make-before-break wiper blades as suggested by wide-face wiper symbols specifically at SM2-8 and SM2-9 and similarly usable throughout.) The probing circuit can be further traced as outgoing through any of the wiper blades S1A, S1B etc., through one or another of the lines in cable 93, wiper blade SM2-8, return wire 94, wiper blade SM1-3, its #1 contact, line 95, to positive bus wire 26.

So long as the relay R18 continues to remain energized, its contact pair R18-86 (Figure 3b), normally closed, remains open, preventing relay R17 from being energized and keeping its contact pair R17-85, open, thereby preventing positive potential from reaching the voltage divider and operating the voltmeter indicator 55, 56, and 57. However, upon encountering any open condition in its probing search through the network connector NC, the circuit previously traced through the winding of relay R18, through any one of the secondary distributors of the S2 and S1 series now becomes opened. Thereupon relay R18 is deenergized, opening its normally closed contact pair of R18-86, while permitting relay R17 to become energized through relay 42. As a consequence, the contact pair R17-85 (Figure 3d), normally open, is now closed, connecting the voltage divider system VD to positive line and thus permitting it to register on its voltmeters 55, 56, and 57 the voltages which correspond to the respective positions of their related wiper contact blades SM2-6 or 7 and SM3-2, the precise operation of which will be more detailedly explained later. In order for the voltmeters to in this way give an instantaneous indication of a numerical integer representing a terminal position at which a continuity test has discovered failure, it is necessary for the SM2 distributor to be instantly arrested upon the occurrence or discovery of a failure. This is accomplished in the following manner.

Upon encountering a failure, as mentioned, relay R17 operates all of its contacts. R17-69, normally open, becomes closed, completing a circuit for the energization of relay R6. At R17-71 and 72, its contacts normally closed become open, releasing relay R10 notwithstanding the closure of the contact pair R6-73. The contact R17-74, normally open, becomes closed, completing an energizing circuit to indicator lamp L7, which denotes that a circuit failure has been discovered during the continuity test. As a result of the deenergization of relay R10, its contact pair R10-36 is opened, resulting in the cessation of stepping impulses to all automatic stepping switches, because of the interruption of positive potential from bus wire 26.

*Manual reset or restarting.*—The operator can now note which one of the bridging terminals is the point of arrestment since the indication on voltmeters 55, 56, and 57 is in step with the various points connected by the secondary switches. After making proper note or performing any other suitable arrangement, he can depress either the reset key 101 (Figure 3b) or the start push button 32 (Figure 3a). Reset key 101 extends positive potential from bus 26 through the winding of relay R15, which upon energization operates all of the R15 contacts in the following manner.

At contact R15-102, normally closed, the circuit 39 is broken, preventing the reenergization of relay R10. At contact pair R15-103, normally open, an alternative path for positive potential is established in lieu of contact pair R10-36, whereupon the stepping switches may resume their movement in accordance with the previous condition of operation for the purpose of zeroizing all stepping switches, or returning them to the position shown. At contact pair R15-104, normally closed, the circuit is interrupted, leading to master relay winding SM1, but at R15-105, an alternative course for winding SM1 is prepared, subject to completion by relay 19 (contact pair R19-106). At R15-107 and 108, both normally open (Figure 3b), a circuit is prepared for the operation of the clear-out reset relay R16 and completed through R19-111 for the locking in of relay R15, thereby holding relay R15 energized after the release of manual push button 101.

Relay R19, normally deenergized (Figure 3c), becomes energized by the closure of contact pair SM1-109 when the master stepping switch SM1 is anywhere in its course of travel except at zero. The contact pair SM1-109 which results in the energization of relay R19 is a homing contact pair, as a consequence of which the master relay SM1 is restored to its zero position, whereas its contact blades are out of engagement with any of its active contact points.

During the time that relay R19 is energized, it closes its contact pair R19-106, completing a pulsing circuit for winding SM1 (Figure 3a) which includes contact pair R15-105 now closed. At contact R19-111 (Figure 3b), a locking circuit is completed for relays R15 and R16, contacts R15-107 and 108 having already been closed by the operation of relay R15. When the SM1 stepping switch reaches its zero position, contact pair SM1-109 is again opened, resulting in the deenergization of relay R19, whereupon all of the R19 contacts previously described as normally open resume their open condition, whereupon pulsating current is cut off from operating winding SM1 at R19-105. As a result of the opening of contact pair R19-111, positive potential is removed from relay R15, permitting all of the R15 contact pairs to resume their normal condition. Clear-out relay R16, however, previously operated as a consequence of the energization of relays R15 and R19 meanwhile has pulled up its locking contact R16-112 and will remain energized so long as it is able to obtain positive potential from branch line 113 of positive bus 26, containing said locking contact. It may obtain it (a) through any off normal contact or contacts SM2-114, S2-114, S1-114, etc. of any of the secondary or intermediate distributors or (b) during closed (energized) condition of relay contacts R20-114 or R40-114, or (c) during the simultaneous operation of reset relays R21 and R21A, closing contacts R21-114 and R21A-114, in series.

As a result of the energization of clear-out relay R16, all of its contacts respond as follows. At its contact pair R16-115, normally closed, a circuit is opened for shutdown relay R17, causing the latter member to become deenergized and releasing the alarm signal. At contact pair R16-116 (Figure 3c), normally open, a circuit is prepared for pulsating the windings of stepping switches S1 and SM3 until they reach their zero positions. All S1 switches return their stepping armatures to zero; so also switch SM3, whose circuit, through normally open contact R40–118, is closed by the operation of relay winding R40 which in turn is energized at SM3–40 when switch SM3 is off-zero. At contact R16–116 normally open becomes closed, and R16–117 normally closed becomes open, diverting the network pulsating circuit 45 which would otherwise operate to restart these stepping switches away from their respective zero positions, to the resetting or zeroizing circuit 79 as aforedescribed.

Stepping switches S2 or any of them which are away from zero position will have operated their normally closed contacts 121 (similar to the aforementioned contacts 81 of the S1 switches), causing them to be open, at the same time closing their contacts 82 which are normally open, whereupon pulsating current over line 46 will restore each of the stepping switches S2A through S2D to zero or starting condition, while current over line 45 is ineffectual.

Tributary channel 47 over which both the operating and restoring impulses for relays SM2 are received is similarly provided with normally closed "back contacts" 122, and normally opened "front contacts" 123, so that they too will zeroize and come to rest either (1) over section 124 of line 47 when zero cam operated contact pair R16–125 is closed or (2) over a path 124A including two normally closed R16 contacts in series with normally closed contacts R14, R41, and R40; that is, contacts R16–131, R40–129, R41–128, R14–127 and R16–126. By thus making the alternative restoration path (124A) signals contingent upon the non-energization of relay R40 through the provision of the contact pair R40–129 in this path, it is assured that master distributor or stepping relay SM3 is zeroized ahead of the SM2 stepping switches.

Thus, upon the depression of reset button 101 (Figure 3b), all of the stepping relays are brought back to zero position in readiness for the initiation of tests on a new apparatus to be tested. It is to be understood, however, that upon any arrestment of the testing apparatus including its several stepping switches such as is consequent upon the discovery of any circuit fault, it is not necessary to reset after the manner just described but instead the attendant may resume the cycle of operation from its point of arrestment as for the purpose of probing the same piece of apparatus under test for additional faults.

If, accordingly, the attendant operator leaves the network connector NC undisturbed and depresses the start button 32 (Figure 3a) following the discovery of a failure such as one supposed in the previous described example, he would thereby reestablish the energization of relay R10 which would close its locking contact R10–38, its pulsation current enabling contacts R10–36, and the starting circuit 33 for pulsing devices 34 at R10–61. The particular secondary stepping switch wiper which had discovered a break in continuity would thereupon advance to a succeeding position upon receiving its first operating impulse, and relay R19 will become energized, as before. The apparatus will thereupon proceed in the manner already described until it encounters a subsequent break in the continuity of a circuit under test, or failing that, until it reaches the outpost or final test position for continuity.

*Automatic reset on intermediate limit.*—In accordance with the structural embodiment shown in the accompanying drawings, a sufficient number of secondary stepping switch wipers have been illustrated in Figures 3f, 3g with which to accomplish as many as one hundred fifty continuity test operations. This capacity may be designed in accordance with the teachings herein to suit any range of requirements, greater or fewer than the indicated number. At the conclusion of this continuity test cycle, or upon the achievement of a preset "intermediate limit condition," as will now be described, the master stepping switch coil SM1 (Figure 3a) will receive an impulse advancing its wiper blades SM1–1, etc. (Figures 3b, 3c) to their #2 contact position, whereupon the system will be in readiness for performing a ground short test operation. The preset intermediate limit serves to avoid unnecessary stepping in case that an apparatus under test does not utilize the active contact capacity of the network connector NC.

When the intermediate master switch wiper SM2–1 (Figure 3c) has reached its #9 contact point according to an arbitrary arrangement, it closes a circuit with the manual switch wiper blade MS3–1. The latter remains on its #1 contact position, so that there is established the energization of relay R21, one of two automatic reset relays whose normally open contact R21–114 (Figure 3b) is thereupon closed, preparing a path which will result in the energization of clear-out relay R16.

An auxiliary wiper arm, identified SM3–3 (Figure 3c), which operates at the same rate of cycling as do the secondary stepping switches, thereafter encounters, here in its #6 position, a contact point which is permanently connected with the #1 contact of manual switch wiper MS3–2. As a consequence, an energizing circuit is closed for operating the other automatic reset relay R21A, which thereupon closes its contact pair R21A–114 (Figure 3b).

As a result of the closure of the two afore-described contact pairs R21–114 and R21A–114, an obvious circuit path is completed for causing to be energized the clear-out relay R16, which thereupon operates its several contact points as will now be described.

Contact pairs R16–125 and R16–116 (Figure 3c), normally open, are now closed, whereby any of the stepping switches S1 that are away from zero are zeroized, as previously described. As a consequence of the opening of a contact pair designated R16–117, the pulsations which had theretofore been permitted to carry over branch line 143 (from R16–117 to 121), and which connect with the normally closed contacts 121 of the windings S2, will now be arrested and in their stead pulsations over line 46 will pass through the contacts 82, closed except when their distributors are at zero position. As a result such distributors will be restored to zero, whereupon their homing contacts will assume the condition in which they are illustrated.

It is to be understood that all of the stepping relays below the master relay SM1 will become restored to zero in readiness for a subsequent type of test cycle, which under the illustrated arbitrary design is the ground test. When all of the SM2 stepping switches have been zeroized, their common zero position contact pair SM2–145 will be permitted to open, deenergizing relay R20. Relay R20 during all other conditions had theretofore been on that account held energized. Contact pair R22–147 (Figure 3a), which is normally closed, together with normally closed contact pairs R15–104 and R14–148, establish a path to the winding SM1 of master relay stepping switch, as a result of which the first incoming pulsation causes the wipers thereof to be advanced to the #2 position for performing the ground test operations.

The only time in which the foregoing stepping pulsation is prevented from occurring is during the interval when wiper blade SM2–3 (Figure 3c) is in contact position, establishing momentarily a current for energizing relay R22. This happens at the conclusion of the first cycle of rotation of relay SM2, and is utilized for the purpose of obtaining from this stepping device a secondary cycle performance as for the utilization of wiper SM2–10 under such conditions as where the number of test operations exceeds one hundred, and therefore requires the use of the supplementary secondary stepping switches.

*Testing for ground short*

When the master stepping switch SM1 has been advanced to the #2 position, its wiper blade SM1–1 (Figure 3b) is in engagement with its #2 contact, establishing a circuit which results in the energization of relay R12.

Its wiper blade SM1–2 (Figure 3c) is in association with its #2 contact, establishing plus current from line 46 to line 79. Its wiper blades SM1–3 and SM1–4 (Figure 3c) are in communication with their respective #2 contacts, which respectively connect lines 94 and 87 parallelly with the control grid of an electronic valve 148 in a resistance tester RT (Figures 3c and 4), passing first through the voltage regulating resisters 149. The operation of the grid control circuit over lines 87 and 94 will be described later.

As a consequence of the energization of relay R12, its contact R12–152 normally opened is now closed, extending operating voltage to light the indicator lamp L4 (Figure 3b), which denotes to the attendant that the ground short test is now in process. As a further result of the operation of relay R12, its contact pair R12–153 normally opened is now closed, preparing a circuit for the energization of the shut-down relay R17, subject to the operation of a tester-operated relay R42. Relay R42 (Figure 4) is operated by the anode potential of electronic valve 148, so that in response to predetermined magnitudes of ground short leakage on its control grid, contact pair R42–155 will become closed (Figure 3b), completing the aforedescribed circuit and energizing relay R17.

The ground test aforedescribed is intentionally designed to function in a manner for determining simultaneously whether either end of a circuit component under test has been inadvertently grounded, and for this reason two grid control circuit lines 87, 94 are utilized parallelly. In the foregoing description these have been traced from the SM1 distributor wipers to the point 175 where line wire 87 connects with intermediate stepping switch wiper SM2–9 (Figure 3f), contact R23–89 being at this time closed, while line 94 connects with intermediate stepping switch wiper SM2–8 because its related contact R23–159 is also at this time closed. Stepping of the two visibly connected wiper elements SM2–9 and SM2–8 occurs thereafter due to pulsations received over line 130 (Figure 3c) through normally closed contact pairs R22–140 and R16–131, so that both proceed to their #1 position and move their off-normal contacts 122 and 123 to the reverse of that shown.

In performing the first cycle of ground test operations, stepping switch SM2 makes a single step movement, receiving its impulse from positive potential bus 43, traceable through the normally closed contacts R16–131, R40–129, R41–128, R14–127, and R16–126. As soon as the secondary distributors S2 leave zero position, they energize relay R41 (Figure 3c) by closure of the off normal contact pair S2–161, whereupon the contact R41–128 (Figure 3c), normally closed, is then open, preventing subsequent pulsations from entering over the just described path to the SM2 windings. The S1 series of relays, however, as well as relay SM3 receive pulsations over lines 45 and 79 through their off normal closed contacts 82 until each reaches its zero position. In a similar manner, relay R40 (Figure 3d) becomes energized under any condition of stepping switch SM3, except when the latter reaches its zero position; in this way relay R40 is controlled by the contact pair SM3–40.

The energization of relays R40 and R41 serves to maintain the intermediate master stepping switches SM2 (Figure 3c) to single step operation and arrestment thereafter because of the opening of contacts R40–129 and R41–128 respectively. These are associated with the tributary pulsating circuit 47. Positive potential is deflected to line 79 upon the opening of contacts R40–163 and R41–164 in the line to switches 81; the wiper SM1–2 connecting with tributary line 46 when disposed upon the No. 2 contact.

As soon as the secondary stepping switches have completed their cycle of rotation, however, their zero position contacts 82 and 81 become restored to the condition in which they are shown, and the switches require to be pulsated through their normally closed contacts 81. A pulsation through these contacts is immediately forthcoming when relays R40 and R41 thereafter become deenergized due to the opening of the off-normal contacts S2A–161 and SM3–162 for the reasons already explained.

The aforedescribed switching of the secondary switches, in cooperation with the grid connectors 87, 94 will proceed until a fault condition is encountered or until the ultimate destination or last component to be tested has been reached. Here again, while provision has been made for the testing of one hundred fifty circuit components, means are provided for shortening the ground test. This foreshortening is achieved when the SM2–1 wiper (Figure 3c) reaches its No. 9 contact point, which is connected to the manually settable contact at which the MS3–1 wiper has been positioned. As a consequence, relay R21 is energized followed by the energization of relay R21A by wipers SM3–3 and MS3–2, with the ensuing result that the normally open contacts R21–114 and R21A–114 of these two relays close as explained above. This permits the energization of clear-out relay R16, which now resets the apparatus for the execution of the next type of fault probing tests, just as has been described at the conclusion of the continuity test.

If, however, instead of running out its test cycle, the apparatus encounters a short condition in one of the circuit components under test, then, dependent upon whether the short is nearest one terminal or the other of the two circuit component terminals which have been connected to the bridgement terminals of the secondary stepping switch terminal jacks NC, a signal will be transmitted over one or the other of lines 87 or 94. Such a signal will enter through its related stepping switch contact arm SM1–3 or SM1–4 the resistance network 149 (Figure 4), diminishing the negative bias on the control grid of vacuum tube 148 to an extent which will permit plate current to flow through the winding of relay R42.

As a consequence, this relay R42 will close its contact pair R42–155 in a circuit loop (Figure 3b) in which contact R12–153 has already been closed, whereupon the energizing circuit will be completed for the shut-down relay R17, which for this reason may also be termed the fault discovery relay. As a consequence of the energization of relay R17, it will open its normally closed contact pairs R17–71, and R17–72 (Figure 3a), breaking the locking circuit for relay R10 and permitting the latter member to become deënergized. The contact pair R17–74 normally open will now become closed, and as a consequence the indicator lamp L8 will be lighted, which will denote to the attendant that a fault has been found respecting a ground short in the subject under test.

The contact R17–85 (Figure 3d), normally open will now become closed, whereupon an energizing potential will be permitted to enter over the voltage divider system for operating the indicator voltmeters 55, 56, and 57.

From this point on, the response will be identical with the one encountered during the continuity test, that is to say, all of the stepping switches will be arrested due to the opening of positive potential supplying contact pair R10–36, because of the deenergization of relay R10, while the reading on the voltmeters 55, 56, and 57 will become manifest in accordance with the position of the stepping switches at the point of arrestment. The hundreds, tens, and units dial indications on these voltmeters will designate numerically the circuit component at which the fault has been discovered. The attendant operator will make a note or reject the subject under test and will accordingly proceed by restoring the test apparatus to its starting position, or by the operation of manual push button 32 will permit the resumption of the probing cycle for the purpose of discovering additional faults in the remainder of the ground short testing cycle as well as in the ensuing types of test cycles.

It has been stated that relay R42 is operated in response to the finding of a ground short fault. From Figure 4 it will be observed that the winding of this relay is located in the plate circuit of an electronic network powered by rectified D. C. from transformer secondary winding 171, one end of which is connected to cathode and the other end to the remote terminal of the relay winding R42. The primary winding of this transformer is preferably supplied with 60-cycle, 110–115 volts. The biasing grid voltage of triode 148 is connected to the positive side of the rectifier for secondary winding 171 as well as to the stepping switch wipers SM1-3 and SM1-4 (Figure 3c) which are in parallel with the master probe circuits 87 and 94 already described. Ground, obtainable at 172 (Figure 3f) is conducted through the normally closed contact pair R13-173, of relay R13, thence over a line 174 to a junction 175. From this point it is traceable over a line 176 (Figure 3c) to the normally closed contact pair R13-177 (Figure 4) normally closed contact pair R24-178, normally closed contact pair R25-179, to the negative side of the rectifier for winding 171.

In order to release the energized relay R42, for proceeding with the test, this ground circuit requires to be broken, and this is accomplished in the following manner.

The attendant depresses button 32 (Figure 3a) and stepping relays or switches advance to their succeeding positions. Negative bias is thereby removed from the grid of tube 148, and with no anode flow relay R42 becomes deenergized, opening its contact pair R42-155 and breaking the circuit which had been holding relay R17 energized. As a consequence of the deenergization of relay R17, its contacts at R17-71 and R17-72, normally closed, will now resume their normal condition, permitting relay R10 to be energized, whereupon the stepping procedure will continue until another ground fault is encountered, or until the ground probing cycle is consummated.

*Insulation breakdown test*

The test for insulation breakdown in certain respects resembles portions of the continuity and ground short tests. It is an endeavor to find whether any of the independent circuit components of the subject under test have inadvertently become partially or totally electrically conductive with one of the other circuit components from which it is required to be electrically independent. In order to accomplish this test, one terminal of each circuit component of the subject under test is electrically compared with the opposite terminal of every other component of the subject under test. The manner in which this is achieved will now be described.

Master distributor SM1 will make one step and in so doing advance its wipers to their No. 3 contact position which is designed to accomplish the insulation test.

As a result of the final operation of distributor SM2 the latter member reached its zero position, permitting the contact pair SM2-145 (Figure 3c) to become open, and deenergizing relay R20. The deenergization of relay R20 permits the resumption of normal closed condition of its contact pair R20-146 (Figure 3a), in circuit 44, whereupon the winding SM1 receives a first pulse from the network bus 43. As a result its wiper SM1-1 (Figure 3b) reaches the No. 3 contact point and insulation test relay R13 becomes energized over an obvious circuit. As a consequence its contacts R13 become transposed as follows: Contact R13-195, Figure 3b, normally open, is now closed, permitting the lamp indicator L5 to become energized and denoting to the operator that the insulation test operation has been started. Contact R13-197, normally open, is now closed, preparing a circuit for the energization of relay R17 which will be completed upon encountering a fault condition. In the circuit of the intermediate distributor wiper SM2-9 the contacts R13-198, 199 (Figure 3f), normally open, are now closed, establishing continuity over the secondary wiper channels 201 and 202.

Upon the next pulse, which advances the master distributor SM1 as well as the secondary distributors, the intermediate distributor, off-normal, contact pair SM2-145 is closed, causing the energization of relay R20, which thereupon opens the contact pair R20-146 and prevents further impulses from reaching the winding of master distributor SM1. Accordingly, this stepping switch will remain in its No. 3 until the insulation test cycle is completed.

As a further consequence of the energization of relay R13, its contact pair R13-177 (Figure 4), normally closed, is now opened, and the same response prevails at its contact R13-173 (Figure 3f). Ground over line 174 is thereby prevented from reaching the negative side of winding 171. Normally open contacts R13-203 are provided between the negative side 211 of the probing circuits 87, 94 and the third to tenth terminals of intermediate wipers SM2-9, 11. These contacts are now closed, tying all "B" terminals into the negative side of probing circuit 211.

As a further consequence of the advancement of wiper SM1-2 to its third or insulation test contact position, stepping impulses over sub-channel 43 directed through the tributary line 46 pass through the normally closed contact pair R41-204 (Figure 3c) to line 79, whence they are distributed to effect the off-normal pulsations for the secondary windings S1. As a further result master relay wiper SM1-3 is connected through the adjustable resistances 149 to the control grid of valve 148. The last master wiper SM1-4 is idle.

It will be remembered that the intermediate stepping switch SM2 makes one step of its several contact engaging arms or wipers for every complete cycle of rotation consummated by all secondary switches. Since the observations required to be made for adequate insulation testing may under certain conditions require the use of a larger number of secondary distributor terminal connections than a single intermediate switch SM2-8, 9 accommodates, provision has been made for making available more SM2 stepping switch levels for accommodating a total of fifteen secondary stepping switches under the obvious, selective control of relay R23 as shown in Figures 3c, 3f, 3g.

Attention is directed to the normally closed contacts R13-205 and 206 (Figure 3a), which are under the described operation caused to be opened and preventing the energization of relays R2 and R4. During insulation testing of network apparatus, in the program corresponding to the No. 1 position of the manual switch, this response disables the closing of all continuity contacts, to prevent false signals.

When one of the S2 stepping switches moves off of its normal or zero position, its off normal contact is closed at S2-161 (Figure 3c), causing to be energized the relay R41. As a consequence of the energization of relay R41, its contact R41-164 (Figure 3c) is opened, preventing pulsations from reaching switch 81, before described, so that as a consequence all of the S1 stepping switches remain in their first position while the S2 stepping switches proceed to advance in a step-by-step manner, one cycle after another, until there is encountered an insulation short. In this way each "A" terminal post (on S1) is tested against all of the "B" terminal posts (on S2) during a single decade cycle.

Assuming that a short is encountered as a result of the aforedescribed test operation, a response would become manifestly traceable from the "A" terminal of the component in which the resistance short has been discovered (Figure 3f or g) through the corresponding S1 wiper, the No. 1 contact at the SM2-8 level of the intermediate stepping switch, and its related wiper, through the contact pair R23-159 or 159A which is now closed by relay R23, line 94, wiper SM1-3 of master stepping switch SM1 and its No. 4 contact (Figure 3c) to the adjustable resister 149 and control grid of valve 148 (Figure 4).

From the "B" terminal of the discovered resistance shorted component, a circuit is traceable (Figure 3f) through its related contact arm and connecting wire of cable 92, thence through its contact R13–198, 199 which is now closed, due to the energization of relay R13, line wire 211, which leads to the transformer winding 171 (Figure 4). When the discovered resistance is of a sufficiently low value to permit the triggering of valve 148, relay R42 becomes energized and as a consequence its contact pair R42–155 (Figure 3b) is closed, completing a circuit for the energization of shut-down relay R17.

As in the previously described operation, relay R17 through its several contacts results in the arrestment of further stepping impulses as well as in the establishment through its contact R17–85 of an indicator signal manifest on the voltmeters 55 through 57.

As in the case of the previously described fault test operations, the discretion thereafter is with the attendant operator as to wherether he will depress push button 32 to resume probing additional components of the network under test, or by depressing push button No. 101 to restore the entire apparatus to starting position for the testing of another subject.

When no faults are discovered in the insulation test cycle, the operation will proceed until distributor SM3 with its contact blade SM3–3 (Figure 3c) reaches its ninth contact, which embraces the 80–90 series of test operations. Wiper SM2–1 of stepping switch SM2 (Figure 3c) reaches its ninth contact as already described in connection with previous examples relating to the No. 1 manual switch preset condition. As a consequence of reaching the aforedescribed ultimate destinations, relays R21 and R21A become energized closing their contacts R21–114, R21A–114 (Figure 3b) with the result of causing energization of relay R16, whereupon all of the stepping relays will be restored to zero in readiness for a subsequent type of failure test.

*Prevention of false alarms.*—During the conduct of tests for mutual short conditions between net work circuits of a cable or other subject under test, additional provision must be made to prevent a false alarm signal from occurring during the singular conditions when opposite ends of any circuit leg or component become connected together. For this purpose there is provided one set of secondary stepping switches, S1A and S2A (Figure 3d), unconnected to the network panel NC; corresponding contacts of these switches being connected together by bridgments 184, so that positive potential obtained over branch line 182 and extended by wiper 183 of switch S1A is carried by wiper 185 of S2A to wiper SM2–4 which is the fourth level wiper of switch SM2 during the time that relay R23 remains deenergized, and its contact pair at R23–186 is closed. This potential is extended to wiper SM2–5 on the fifth level when relay R23 becomes energized and its normally open contact pair R23–212 is closed. The energization of relay R23 is achieved by wiper SM2–3, relay R22 and the contact R22–215.

As a consequence of the just described progression which coincides with the single step operation of secondary relays of the S1 series, a succession of relays numbered R23 through R38 is energized for the purpose of blocking out the false alarm conditions aforedescribed.

Because the conventional design of stepping switches have only ten active contact positions whereas fifteen relays numbered R24 through R38 are required to be operated successively, provision has been made for utilizing two cycles of operation of the S1A stepping switch for this purpose in the following manner. The No. 10 contact of the SM2 stepping switch wiper SM2–3 (Figure 3c) is connected to relay R22 and to positive potential, so that upon the completion of the first sweep of the SM2 stepping switch, relay R22 becomes energized, with the result that its contact R22–214 is closed, establishing a locking circuit for itself while its contact R22–215 is closed for the purpose of energizing relay R23.

As a consequence of the energization of relay R23, its contact pair R23–186 (Figure 3d) normally closed, is now opened, whereas its contact pair R23–212, normally open, is now closed. For the second cycle of rotation on the part of stepping switch S1A, therefore, wiper SM2–5 becomes connected to wiper 185 while originally wiper SM2–4 was connected therewith.

As a result of the energization of relays R24 through R38, each during its related step and arrestment of two cycle stepping switch S1A, their respective contacts R24–224 to R38–238 (Figure 3f) at the No. 9 and the No. 11 levels of distributor SM2 become opened. Their normal condition is closed. Each contact R24–224, etc. is thus opened during the sole interval in which its related secondary distributor S2 happens to be bridging the "B" terminal connected to any "A" terminal under test.

At the end of the test the clear-out relay R16 becomes energized and opens a contact pair R16–241, normally closed, opening the locked circuit for relay R22 which in turn releases its contact pair R22–215, opening the locked circuit of relay R23. Thereupon the plural cycle feature of distributor S1A is disabled until a subsequent condition for insulation test becomes initiated.

*Multiple-leg testing for continuity, etc.*—It is recognized that in nearly all circuit networks as well as many cable assemblies, some circuit components may be employed which have more than two electrical terminals connected together. In many instances such components have what may be termed as three legs to a circuit component, and occasionally there may be encountered some with four or more legs. When testing a subject network in which such conditions prevail, provision must be made for preventing a false alarm signal from being generated not only upon the encounter of the primary opposite terminal of the circuit component but in addition upon encounter with its tertiary or additional legs or circuit component elements. To accommodate for these cases, special tailoring and adaptation principles are incorporated to prevent the generation of false alarm condition signals and examples thereof will now be described.

In connection with the No. 1 contact position of manual switch MS3, it has already been called to attention that a primary response has been the resultant energization of relays R1 and R2, R2 being disabled when its intimately related contact pair R13–105 (Figure 3a), normally closed, is opened as a result of the energization of relay R13. As has been said, relay R13 is energized only during the insulation test which is the third cycle of operation of master distributor SM1. During this test, the general features of which have just been described, if relay R1 is closed, there is established the following condition as a result of its effect upon contacts R1.

The contacts R1–64 and 65, Figure 3f, which are normally closed, now become open so that the probing circuit leg 211 is cut off from extending into circuits 201 and 202. This cuts off the objective or "B" terminals of the panel NC, first 20 positions, from becoming connected with their related subject or "A" terminals.

It is to be observed that at the first 10 positions, contacts R4–X have been provided across the final three pairs of bridging terminals while at the second set of 10 positions contacts R2–X have been provided across the final five pairs of bridging terminals.

By inserting a third or subsequent leg of multiple-legged test circuits into one or another of the first twenty panel terminals, which are used solely during the energization of the R2 or R4 relays, a false signal can be prevented from indicating an alarm when the secondary wipers reach the position at which they endeavor to sense these positions for continuity faults. Under circumstances where the same circuit component requires to be tested for insulation failure also, the artificial bridgement, caused by the R2 or R4 contacts for the purpose of preventing a false alarm signal during continuity tests, is removed during insulation test.

Of course, other levels can be modified, instead, as may be recognized.

Capacitance testing

Where a harness or network is provided with some circuitry in which is contained measured or measurable capacitance factors, provision has been made in accordance with the instant invention for a modified test program, allowing also to verify or confirm these capacity characteristics. For this purpose a special stepping switch designated SM4 is employed to serve in lieu of the intermediate stepping switch SM2.

Following the completion of the third or insulation test with its concluding energization of relay R16 for clearing out or zeroizing all of the stepping switches, the energizing circuit for the master stepping switch SM1 is completed and its contactors are advanced to the fourth position. As a consequence, relay R14 (Figure 3b) becomes energized, causing to be closed its contact pair R14–241 (Figure 3c) and completing a circuit for the winding of stepping switch of SM4 which thereupon locks itself over its off-normal contact pair SM4–242.

It will be noted that in the energizing circuit for relay R14, a normally open contact pair designated R3–14 (Figure 3b) has been provided. Also, that relay R3 for closing this contact pair is located in the No. 2 position of the manually settable switch MS3–2 (Figure 3a). From this it is to be understood that a circuit or harness is tested for capacitance in a second test program. The start of this program can be substantially the same as above.

Also a normally closed contact pair R3–243 is during this test operation caused to be opened without which there would follow the energization of relay R15, which is located in the resetting circuit for zeroizing all of the stepping switches, a performance which restores the entire system apparatus.

The propriety of the capacitance factors in those circuits which are to be tested is accomplished by a Wheatstone bridge arrangement in which the unknown capacitance factors are balanced against leg portions of the bridge containing known standards of capacitance. In the arbitrary example, five capacitance circuits are contemplated and these utilize the first five contact positions of the SM4 stepping wiper SM4–2 (Figure 3c). The bridge forms a potential control to the grid element of a triode indicated 244 (Fig. 5). As in the case of insulation and ground tests, the plate voltage is utilized to energize a relay, in this instance designated R43. A contact operated by this relay and designated R43–246 (Figure 3b) completes a circuit which had been partially prepared by the closure of an R14 contact designated R14–247.

Following the completion of this circuit, its relay R17 becomes energized, with the arrestment of all stepping relays due to the opening of its contact pairs R17–71 and 72 (Figure 3c), as in the case of previously described fault discoveries. Rectified direct current for operating the vacuum tube circuit (Figure 5) is obtained from a secondary winding 248 of a transformer from which another secondary winding 249 may be utilized for purposes of operating the Wheatstone bridge. The standard leg of the bridge in the first three positions of the SM4 distributor is shown to be balanced by a single standard condenser element 251, wired in parallel, whereas the other two positions are shown to be provided with independent and separate capacitors 252 and 253. By this arrangement, precise circuit characteristics may be accurately balanced including both resistance and capacitance characteristics and the triggering of the grid element may be regulated as to tolerance by the adjustable resisters 255.

When no fault is discovered in any of the circuits thus tested for capacitance, distributor SM4 will complete one cycle of revolution and cause to be opened its locking contacts SM4–242 when it reaches its zero position, whereat the customary cam permits this contact pair to become opened to break the energizing current to winding SM4.

The described network testing apparatus thus will be understood to include automatically operative switching to advance from one circuit component to another executing each of several different classes of tests for fault according to an established sequence. When a fault condition is found the apparatus is instantly arrested at the position which corresponds to the encountered fault and a visual identifying signal becomes registered, telling the attendant by numerical reading the precise location of the fault. The subject under test may then be totally rejected or at the election of the attendant the tests may be fully run out for the purpose of finding other faults subsequent in respect to the sequence of testing.

Having thus fully disclosed my novel network testing apparatus and its manner of operation, I claim as my invention:

1. In a test device, a plurality of groups of connecting terminal pairs to be connected to respective circuits to be tested, a pair of secondary switches associated with each group of terminal pairs, each of said switches having a movable contact and a number of stationary contacts adapted to be sequentially engaged by the movable contact, the corresponding stationary contacts of the switches connected to the respective connecting terminal pairs of its group, a pair of group control switches each of which has a movable contact and a number of stationary contacts adapted to be sequentially engaged by the latter movable contact, corresponding stationary contacts of said group control switches connected to the respective movable contacts of a pair of secondary switches associated with one of said respective groups of connecting terminal pairs, a test circuit for sensing abnormal circuit conditions connected between the movable contacts of said group control switches, means for stepping the pair of switches associated with each group of connecting terminal pairs in unison, means responsive to the completion of the sweep of the movable contacts of said pairs of secondary switches across the stationary contacts thereof to step said group of control switches one position to connect another group of connecting terminal pairs with the test circuit, and means connected to the test circuit and responsive to an abnormal condition for arresting the movement of said group control and secondary switches.

2. In a test device, a plurality of groups of connecting terminals, each group having terminals for connection to ten respective circuits to be tested, respective secondary switching means associated with said groups of connecting terminals and each including movable contact means and ten stationary contact means adapted to be engaged sequentially by said movable contact means and connected respectively to the connecting terminals to be associated with the ten circuits to be tested, group control switching means having movable contact means and ten stationary contact means adapted to be sequentially engaged by said latter movable contact means and connected respectively to the movable contact means of said secondary switching means, a test circuit for sensing abnormal circuit conditions connected between the movable contact means of said group control switching means and said connecting terminals, a units identifying switching means associated with said secondary switching means, a tens connecting terminal identifying switching means associated with said group control switching means, said terminal identifying switching means each having ten stationary contacts and a movable contact for sequentially engaging said stationary contact, means for stepping said secondary switching means and said units switching means in unison, means responsive to the positioning of said secondary switching means into its tenth position for stepping said group control switching means and said tens connecting terminal identifying switching means one position, a voltage divider associated with each of said latter switching means and each having ten terminals which are spaced to provide voltages indicative of the ten integers of a ten digit decimal series, the terminals of said voltage dividers connected respectively to the corresponding stationary contact of the associated terminal identifying switching means, respective voltmeters connected in series with the movable contact of said identifying switching means for identifying the number of the connecting terminals being tested at any particular moment, and arresting means connected to said test circuit and responsive to the existence of an abnormal condition for arresting the operation of all of said switching means.

3. In a test device, a number of pairs of connecting terminals to be connected to respective circuits to be tested, a pair of switches each having a movable contact and a number of stationary contacts adapted to be sequentially engaged by said movable contact, the corresponding stationary contacts of the switches connected to the opposite terminals of a pair of said connecting terminals, fault sensing means connected across said movable contacts, means for cyclically stepping one of said switches and for stepping the other switch once for each cycle of operation of said former switch whereby the fault sensing means is connected sequentially between each terminal of a pair of connecting terminals and each of the opposite terminals of the remaining pairs of connecting terminals, and alarm means connected to said fault sensing means for indicating the existence of an abnormal condition.

4. Testing apparatus comprising a plurality of pairs of connecting terminals to be connected to respective circuits to be tested, a test circuit for testing electrical continuity, a test circuit for measuring insulation resistance, first switching means for connecting said continuity test circuit to said pairs of connecting terminal sequentially, second switching means operable for connecting said insulation test circuit between a terminal of each of said pairs of connecting terminals and the opposite terminals of the remaining pairs of connecting terminals sequentially, control means for automatically operating said first and second switching means sequentially, means for indicating a failure of circuit continuity, means for indicating insulation failure, respective means connected between said test circuits and the associated indicating means for operating said indicating means when the associated test circuit indicates respectively failure of continuity and insulation failure, and means for identifying the circuit in which the abnormal condition occurs.

5. Testing apparatus comprising a number of connecting terminals to be connected into respective circuits to be tested, respective fault sensing means for sensing the presence of a number of different types of circuit faults, an alarm means, means for providing an indication of the fault sensing means which is connected with said terminals at any particular moment, switching means for automatically sequentially connecting each of said fault sensing means to said connecting terminals in a predetermined sequence, means connected with said fault sensing means for energizing said alarm means on the occurrence of a fault, arresting means for arresting the operation of said switching means upon the sensing of a fault by any of said fault sensing means, a connecting terminal identifying means which is adjustable to a number of successive terminal indicating positions which identify the connecting terminals in the order in which they are connected to said fault sensing means, and means operating said connecting terminal identifying means in unison with said switching means.

6. Testing apparatus comprising a number of connecting terminals to be connected into respective circuits to be tested, respective fault sensing means for sensing the presence of a number of different types of circuit faults, an alarm means, means for providing an indication of the fault sensing means which is connected with said terminals at any particular moment, switching means for automatically sequentially connecting each of said fault sensing means to said connecting terminals in a predetermined sequence, means connected with said fault sensing means for energizing said alarm means on the occurrence of a fault, and arresting means for arresting the operation of said switching means upon the sensing of a fault by any of said fault sensing means.

7. Testing apparatus comprising a number of connecting terminals to be connected into respective circuits to be tested, respective fault sensing means for sensing the presence of a number of different types of circuit faults, an alarm means, switching means for automatically sequentially connecting each of said fault sensing means to said connecting terminals in a predetermined sequence, means connected with said fault sensing means for energizing said alarm means on the occurrence of a fault, and a connecting terminal identifying means which is adjustable to a number of successive terminal indicating positions which identify the connecting terminals in the order in which they are connected to said fault sensing means, and means operating said connecting terminal identifying means in unison with said switching means.

8. In a test device, a number of pairs of connecting terminals to be connected to respective circuits to be tested, a circuit for testing insulation resistance, means for connecting said test circuit between each terminal of a pair of connecting terminals and the opposite terminals of the remaining pairs progressively, an alarm device connected to said test circuit for indicating an abnormally low level of insulation resistance sensed by the test circuit, and a fault preventing means for preventing the operation of said alarm device when said test circuit is connected across terminals of the same circuit.

9. In a test device, a number of pairs of connecting terminals to be connected to respective circuits to be tested, said pairs of terminals being unconnected with each other in the test device, a circuit automatically testing insulation resistance, means for connecting said test circuit between a terminal of each pair of connecting terminals and the opposite terminals of the remaining pairs progressively, and an alarm device connected to said test circuit for indicating an abnormally low level of insulation resistance sensed by the test circuit.

10. In a test device, a number of connecting terminals to be connected to respective circuits to be tested, a test circuit for sensing abnormal circuit conditions, switching means having a number of switch positions corresponding to the number of circuits to be tested and connected between said test circuit and said connecting terminals for sequentially connecting said test circuit to said connecting terminals, a voltage divider having a number of terminals corresponding to the number of circuits to be tested, voltmeter means, switching means connected between said voltmeter means and said voltage divider for connecting said voltmeter means to one of the voltage divider terminals, means for stepping all of said switching means in unison, and arresting means connected to said test circuit and responsive to the existence of an abnormal condition for arresting the operation of all of said switching means.

11. In a test device, a plurality of groups of connecting terminals, each group having terminals for connection to ten respective circuits to be tested, respective secondary switching means associated with said groups of connecting terminals and each including movable contact means and ten stationary contact means adapted to be engaged sequentially by said movable contact means and connected respectively to the connecting terminals to be associated with the ten circuits to be tested, group control switching means having movable contact means and ten stationary contact means adapted to be sequentially engaged by said latter movable contact means and connected respectively to the movable contact means of said secondary switching means, a test circuit for sensing abnormal circuit conditions connected between the movable contact means of said group control switching means and said connecting terminals, a units indicating means, a tens indicating means, respective means operated in unison with said secondary switching means and said group control switching means for operating said tens and units switching means.

12. In a test device, a plurality of groups of connecting terminals to be connected to respective circuits to be tested, respective secondary switching means associated with said groups of connecting terminals and each including movable contact means and a number of stationary contact means adapted to be engaged by said movable contact means and connected respectively with the connecting terminals of the associated group, group control switching means having movable contact means and a number of stationary contacts adapted to be engaged by the movable contact means thereof and connected respectively to the movable contact means of said secondary switching means, a test circuit for sensing abnormal circuit conditions connected between the movable contact means of said group control switching means and said connecting terminals, means for stepping said secondary switching means, and means responsive to the completion of the sweeping of the movable contact means of said secondary switching means across the stationary contacts thereof for stepping said group control switching means one position to connect another group of connecting terminals to said test circuit, and arresting means connected to said test circuit and responsive to the existence of an abnormal condition for arresting the operation of said secondary switching means and said group control switching means.

13. Testing apparatus comprising a number of pairs of connecting terminals to be connected to respective circuits to be tested, means for sensing a failure in circuit continuity, means for sensing a failure in circuit insulation, means for coupling said continuity failure sensing means across said respective pairs of connecting terminals sequentially, means for connecting said insulation failure sensing means between each terminal of said pairs of connecting terminals and the opposite terminals of the remaining pairs of connecting terminals, bridging means associated with some of said pairs of connecting terminals for connecting the opposite terminals of each of said latter pairs together during the connection of the continuity failure sensing means thereto and for disconnecting said latter terminals when said insulation failure sensing means is connected thereto.

14. Testing apparatus comprising a number of pairs of connecting terminals to be connected to respective circuits to be tested, means for sensing a failure in insulation, means for sequentially connecting said insulation failure sensing means between the terminal of each of said pairs of connecting terminals and the opposite terminal of the remaining pairs of connecting terminals, alarm means associated with said fault sensing means for indicating the presence of an abnormally low insulation resistance, and means for preventing the operation of said alarm means when said fault sensing means is connected between certain predetermined terminals associated with different pairs of connecting terminals whereby false alarm indications are prevented when terminals of different pairs of connecting terminals are associated with the same circuit.

References Cited in the file of this patent

UNITED STATES PATENTS

| | | |
|---|---|---|
| 2,243,755 | James | May 27, 1941 |
| 2,329,491 | Sulzer | Sept. 14, 1943 |
| 2,434,946 | McKim | Jan. 27, 1948 |
| 2,492,733 | Burchell | Dec. 27, 1949 |
| 2,584,680 | Doncyson | Feb. 5, 1952 |